United States Patent
Omi et al.

(10) Patent No.: US 8,814,481 B2
(45) Date of Patent: Aug. 26, 2014

(54) OIL SUPPLY DEVICE FOR HOLE CUTTING APPARATUS

(75) Inventors: Shohei Omi, Anjo (JP); Kazuyoshi Inagaki, Anjo (JP)

(73) Assignee: Omi Kogyo Co., Ltd., Anjo-shi, Aichi-ken (JP)

( * ) Notice: Subject to any disclaimer, the term of this patent is extended or adjusted under 35 U.S.C. 154(b) by 156 days.

(21) Appl. No.: 13/421,749

(22) Filed: Mar. 15, 2012

(65) Prior Publication Data

US 2012/0328380 A1    Dec. 27, 2012

(30) Foreign Application Priority Data

Jun. 21, 2011 (JP) .................. 2011-137367

(51) Int. Cl.
*B23Q 11/10* (2006.01)
*F16N 7/00* (2006.01)
*B23B 51/04* (2006.01)

(52) U.S. Cl.
CPC .............. *F16N 7/00* (2013.01); *F16N 2270/30* (2013.01); *B23Q 11/1023* (2013.01); *B23B 51/042* (2013.01); *F16N 2270/72* (2013.01)
USPC .......................................................... 408/57

(58) Field of Classification Search
CPC .......... B23Q 11/1023; B23Q 11/1015; B23B 51/042; B23B 51/0486
USPC ............................... 408/57, 59, 56
See application file for complete search history.

(56) References Cited

U.S. PATENT DOCUMENTS

| | | | | |
|---|---|---|---|---|
| 4,193,721 A | * | 3/1980 | Hougen | 408/68 |
| 4,204,783 A | * | 5/1980 | Hougen | 408/68 |
| 4,385,853 A | * | 5/1983 | Strange et al. | 408/68 |
| 4,624,608 A | * | 11/1986 | Shiomi et al. | 408/56 |
| 4,753,556 A | * | 6/1988 | Solko | 408/16 |
| 5,447,397 A | * | 9/1995 | Asano | 408/59 |
| 7,144,207 B2 | * | 12/2006 | Weigel | 408/56 |
| 2008/0286063 A1 | * | 11/2008 | Shimada | 409/136 |

FOREIGN PATENT DOCUMENTS

| | | |
|---|---|---|
| CN | 101244520 A | 8/2008 |
| JP | 06-262480 A | 9/1994 |
| JP | 07-276121 A | 10/1995 |
| JP | 10-138088 A | 5/1998 |
| JP | 10-225842 A | 8/1998 |
| JP | 2005-161500 A | 6/2005 |
| JP | 2006-061993 A | 3/2006 |
| JP | 2007-098556 A | 4/2007 |
| JP | 4558621 B2 | 7/2010 |
| TW | 519503 | 2/2003 |
| WO | WO 2006/009184 A1 | 1/2006 |

* cited by examiner

*Primary Examiner* — Daniel Howell
*Assistant Examiner* — Nicole N Ramos
(74) *Attorney, Agent, or Firm* — Shay Glenn LLP

(57) ABSTRACT

An inner cylinder, a pin, and a valve body are movable in a reciprocating manner in a direction along the rotational axis in relation to an oil supply pipe. At a proximate position, where a cutter attaching portion is close to the oil supply pipe, a rod portion of the valve body is supported by a pressure receiving portion of the holder inner cylinder due to the elastic force of a compression coil spring, such that an opening-closing portion of the valve body closes a valve port of the oil supply pipe. At a separated position, where the cutter attaching portion is separated from the oil supply pipe, the rod portion of the valve body is supported by the upper end of the pin due to the elastic force of the compression coil spring, instead of the pressure receiving portion, such that the opening-closing portion opens the valve port.

5 Claims, 5 Drawing Sheets

OIL SUPPLY DEVICE FOR HOLE CUTTING APPARATUS

BACKGROUND OF THE INVENTION

The present invention relates to an oil supply device for a hole cutting apparatus having an oil supply pipe in a holder with a cutter attaching portion, and more particularly, to an oil supply device capable of opening and closing the oil supply pipe when the hole cutting apparatus is performing a hole cutting operation.

Conventionally, Japanese Patent No. 4558621 discloses an oil supply device for a hole cutting apparatus that has an on-off valve between the upper end of the oil supply pipe and the oil tank. The on-off valve opens and closes as the oil supply pipe is lifted and lowered with upward and downward movement of the cutter. The oil supply device also has an upper valve of a center pin, which is urged by a spring via a pushing member. In addition to the opening and closing action of the on-off valve, the upper valve is opened and closed in relation to a cutter attaching portion as the cutter is lifted and lowered. Such double opening and closing actions performed by the two valves achieve automated oil supply and thus conserves the amount of oil used.

However, since the device of the above publication needs to perform double opening and closing actions, the opening and closing structure is complicated.

SUMMARY OF THE INVENTION

Accordingly, it is an objective of the present invention to provide an oil supply device for a hole cutting apparatus that is capable of achieving automated oil supply with a simple opening and closing structure.

To achieve the foregoing objective and in accordance with one aspect of the present invention, an oil supply device for a hole cutting apparatus is provided that includes a support member, a holder, a cutter attaching portion, an oil supply pipe, a pin for discharging a cut piece, and a valve body. The holder is supported by the support member to be rotational relative to the support member and movable in a reciprocating manner in a direction along a rotational axis. The cutter attaching portion is provided on a first side of the holder. The oil supply pipe has a valve port and is attached to the support member by being inserted into the holder along the rotational axis of the holder on a second side, which is a side opposite to the cutter attaching portion in the direction along the rotational axis of the holder. The pin is inserted into the cutter attaching portion from the first side of the holder along the rotational axis of the holder, and is movable in a reciprocating manner in the direction along the rotational axis of the holder. The valve body is inserted into the holder between the oil supply pipe and the pin along the rotational axis of the holder. The valve body is movable in a reciprocating manner in the direction along the rotational axis of the holder. The oil supply pipe, the valve body, and the pin are arranged relative to the holder and along the rotational axis of the holder. The holder, the pin, and the valve body are movable in a reciprocating manner in the direction along the rotational axis of the holder in relation to the oil supply pipe. The valve body is movable in a reciprocating manner in a direction along the rotational axis of the holder in relation to the pin. At a proximate position, where the cutter attaching portion of the holder is close to the oil supply pipe, the valve body contacts the valve port of the oil supply pipe, while being supported by the holder, so that the valve body closes the valve port. At a separated position, where the cutter attaching portion of the holder is separated away from the oil supply pipe, the valve body is separated from the valve port of the oil supply pipe, while being supported by the pin instead of the holder, so that the valve body opens the valve port.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An oil supply apparatus for a hole cutting apparatus according to one embodiment of the present invention will now be described with reference to the drawings.

Figure 1:
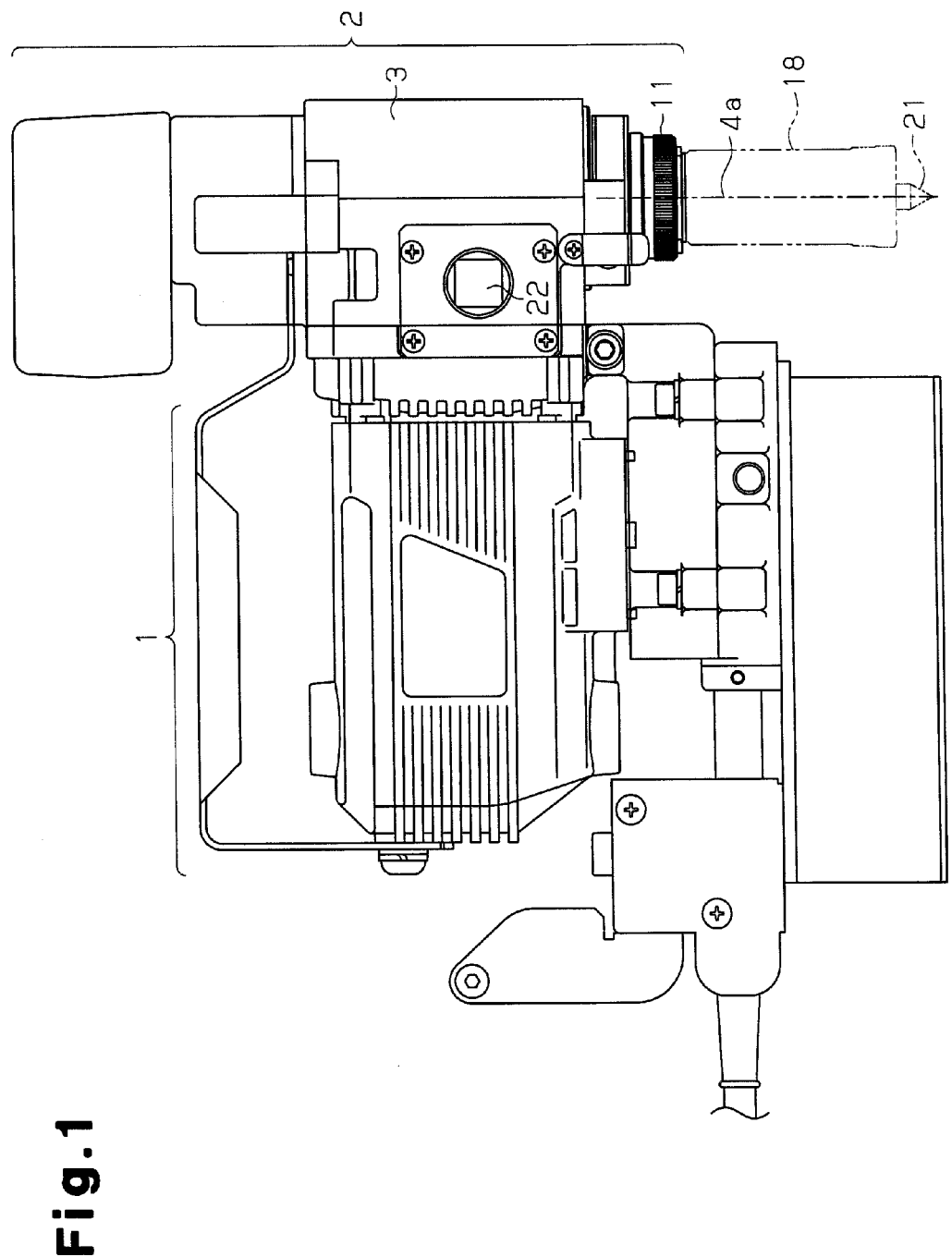
FIG. 1 is a side view illustrating a hole cutting apparatus according to one embodiment of the present invention.
Figure 2:
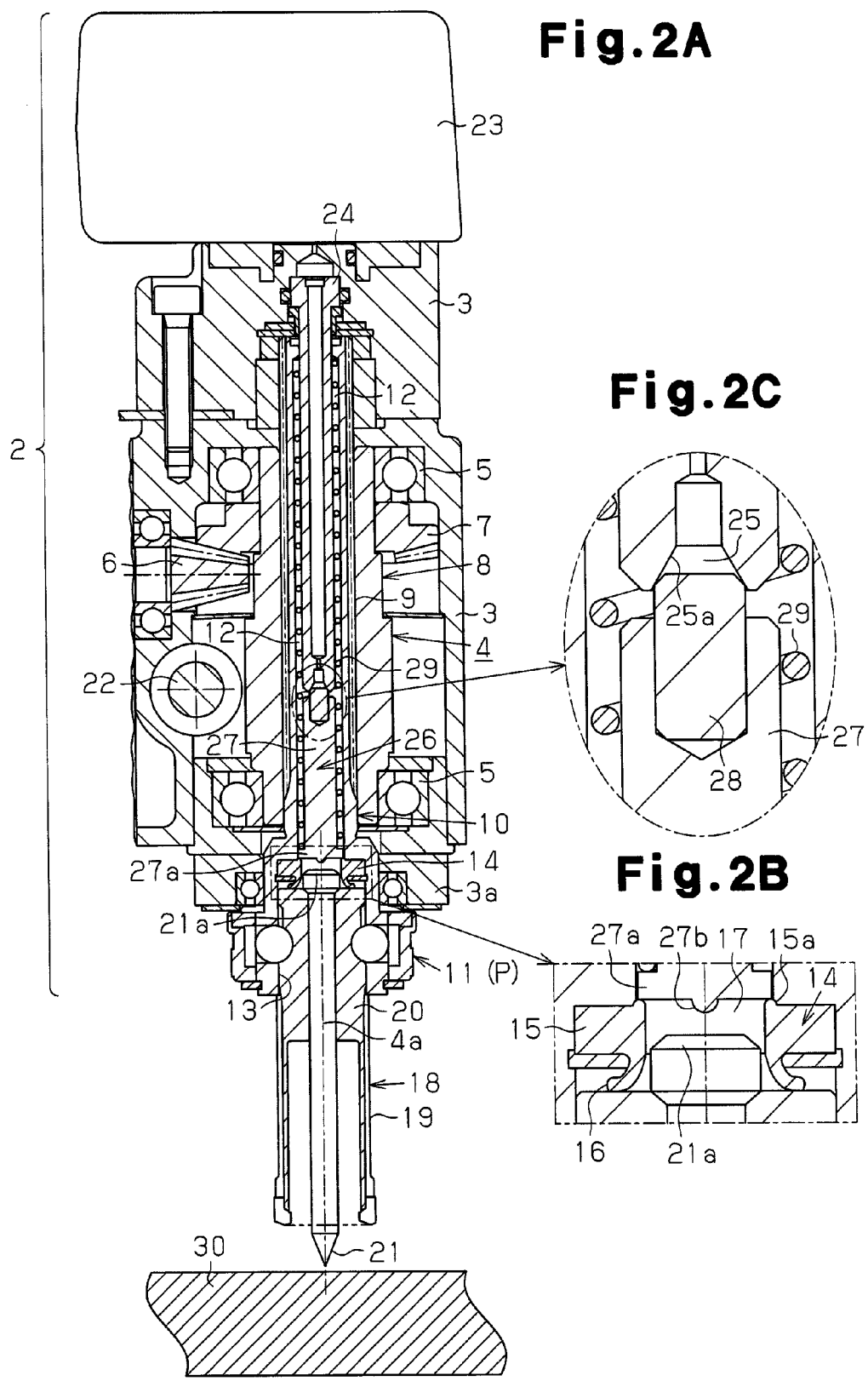
FIG. 2A is a partial cross-sectional view of the hole cutting apparatus of FIG. 1 before it starts a hole cutting operation, illustrating a state in which the oil supply pipe of the oil supply device is closed.
FIG. 2B is a partially enlarged view of FIG. 2A.
FIG. 2C is a partially enlarged view of FIG. 2A.

A hole cutting apparatus shown in FIG. 1 has a drive unit 1 and a support unit 2 attached to the drive unit 1. As shown in FIGS. 2A to 2C, the support unit 2 has a support member 3 that incorporates a holder 4, which is rotationally supported by bearings 5. The holder 4 includes an outer cylinder 8, an inner cylinder 10, and a cutter attaching portion 11. The outer cylinder 8 is rotated about a rotational axis 4a by gears 6, 7, which are rotated by the drive unit 1. The inner cylinder 10 is located inside and coupled to the outer cylinder 8 by means of a spline 9. The cutter attaching portion 11 is attached to a lower side, or a first side, of the holder 4. Specifically, the cutter attaching portion 11 is located outside the support member 3 and attached the lower end of the inner cylinder 10. The inner cylinder 10 is rotated by the outer cylinder 8 via the spline 9, and is lifted and lowered in a direction along the rotational axis 4a relative to the outer cylinder 8. A movable base 3a is located below the support member 3 and movable upward and downward. The cutter attaching portion 11 is supported by the movable base 3a to be rotational about the rotational axis 4a. Accordingly, the cutter attaching portion 11 is rotated and lifted and lowered together with the inner cylinder 10.

A center hole 12 is formed in the inner cylinder 10 to extend from the upper end to the cutter attaching portion 11. An attaching hole 13 is formed in the cutter attaching portion 11.

In the attaching hole 13, a pressure receiving portion 14 is fitted at the boundary with the center hole 12 in the inner cylinder 10. The pressure receiving portion 14 is formed of rubber (elastic material). The pressure receiving portion 14 has a cylindrical base 15, a thin cylindrical sealing portion 16, and an oil hole 17. The cylindrical sealing portion 16 extends downward from the lower end of the cylindrical base 15. The oil hole 17 is located inside the cylindrical base 15 and the cylindrical sealing portion 16 and communicates with the center hole 12 in the inner cylinder 10. A mount portion 15a, which has a small area, is formed on the cylindrical base 15. The mount portion 15a is located on the edge of the oil hole 17 and protrudes upward.

A hole cutter 18 includes a blade cylinder 19 and an attaching cylinder 20. The blade cylinder 19 extends downward from the attaching cylinder 20. A center pin 21 (cut piece discharging pin) is inserted into the attaching cylinder 20 from above and protrudes into the blade cylinder 19. Since an upper end 21a of the center pin 21 has a large diameter, the center pin 21 does not fall off the attaching cylinder 20 into the blade cylinder 19. When the attaching cylinder 20 of the hole cutter 18 is detachably attached to the attaching hole 13 of the cutter attaching portion 11, the center pin 21, which protrudes upward from the upper end of the attaching cylinder 20, is inserted into the oil hole 17 of the pressure receiving portion 14, and the cylindrical sealing portion 16 of the pressure receiving portion 14 contacts the upper end of the attaching cylinder 20 at a position outside of the center pin 21.

A handle 22, which can be manipulated from the outside, is supported by the support member 3. When the handle 22 is rotated, the movable base 3a is lifted or lowered via a pinion and a rack (neither is shown), so that the inner cylinder 10 and the cutter attaching portion 11 are lifted or lowered in the direction along the rotational axis 4a, together with the hole cutter 18.

An oil tank 23 is placed on the support member 3 on the side opposite to the cutter attaching portion 11, or on the second side, in the direction along the rotational axis 4a. An oil supply pipe 24 is located below the oil tank 23 and non-rotationally attached to the support member 3. The oil supply pipe 24 is inserted into the center hole 12 of the inner cylinder 10 and along the rotational axis 4a to extend downward. A valve port 25 is formed at the lower end of the oil supply pipe 24. The valve port 25 has a contact surface 25a, which spreads toward the lower end. A valve body 26 is located between the center pin 21 and the oil supply pipe 24. Specifically, the valve body 26 is inserted into the center hole 12 of the inner cylinder 10 to extend along the rotational axis 4a. The valve body 26 can be lifted and lowered in the direction along the rotational axis 4a. The valve body 26 has a rod portion 27 and an opening-closing portion 28, which is fitted and bonded to the upper end of the rod portion 27 and projects upward. The opening-closing portion 28 is formed of rubber (elastic material). A compression spring 29 is located in the center hole 12 of the inner cylinder 10 and is wound about the outer circumference of the valve body 26 and the oil supply pipe 24. The compression spring 29 is supported between a flange 27a formed at the lower end of the rod portion 27 of the valve body 26 and the upper end of the inner cylinder 10. A protrusion 27b having a small area is formed at the center of the end face of the flange 27a of the rod portion 27.

Before the hole cutting apparatus illustrated in FIGS. 2A to 2C performs a hole cutting operation, the inner cylinder 10 and the cutter attaching portion 11 are lifted to the highest position in the direction along the rotational axis 4a together with the hole cutter 18, and the center pin 21 is at a proximate position P, where the center pin 21 protrudes downward from the blade cylinder 19. At the proximate position P, the flange 27a of the valve body 26 is located on the mount portion 15a of the pressure receiving portion 14, which faces the holder 4. Also, the flange 27a is separated from the upper end 21a of the center pin 21, which is located in the oil hole 17 of the pressure receiving portion 14. The opening-closing portion 28 of the valve body 26 closes the valve port 25 of the oil supply pipe 24. Therefore, oil that flows to the oil supply pipe 24 from the oil tank 23 is stopped at the valve port 25 of the oil supply pipe 24. If the inner cylinder 10 rotates, the rotation is almost not transmitted to the valve body 26 because the mount portion 15a of the pressure receiving portion 14 slides on the flange 27a of the valve body 26.

Figure 3:
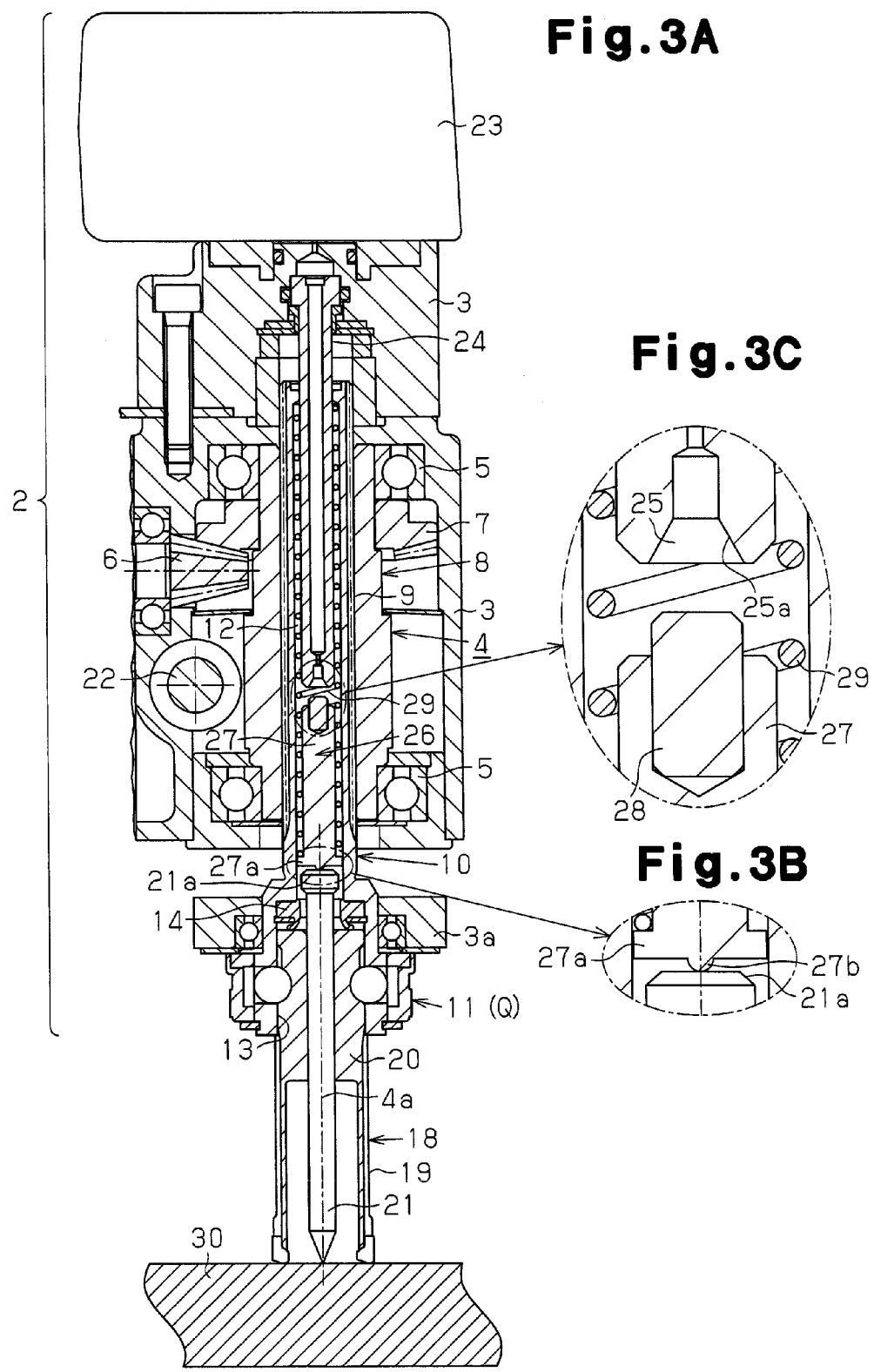
FIG. 3A is a partial cross-sectional view of the hole cutting apparatus immediately before it starts a hole cutting operation, illustrating a state in which the oil supply pipe is open.
FIG. 3B is a partially enlarged view of FIG. 3A.
FIG. 3C is a partially enlarged view of FIG. 3A.

As shown in FIGS. 3A to 3C, when the inner cylinder 10 and the cutter attaching portion 11 are lowered in the direction along the rotational axis 4a together with the hole cutter 18, the hole cutting apparatus is at a state immediately before performing a hole cutting operation. That is, the center pin 21 contacts a workpiece 30 and enters the blade cylinder 19, and the blade cylinder 19 starts cutting the workpiece 30. In a state immediately before the hole cutting apparatus starts cutting a hole, the protrusion 27b of the flange 27a of the valve body 26 is pressed against the upper end 21a of the center pin 21 by the elastic force of the compression spring 29 and is therefore separated from the mount portion 15a of the pressure receiving portion 14, which faces the holder 4. Accordingly, the opening-closing portion 28 of the valve body 26 opens the valve port 25 of the oil supply pipe 24. Thus, the oil that has flowed out from the oil tank 23 to the oil supply pipe 24 flows out of the valve port 25 of the oil supply pipe 24 and is supplied to the blade cylinder 19 of the hole cutter 18 via grooves (not shown) on the circumferential surfaces of the valve body 26 and the center pin 21. Even if the inner cylinder 10 rotates, the rotation is almost not transmitted to the valve body 26 because the upper end 21a of the center pin 21 slides on the protrusion 27b of the flange 27a of the valve body 26.

Figure 4:
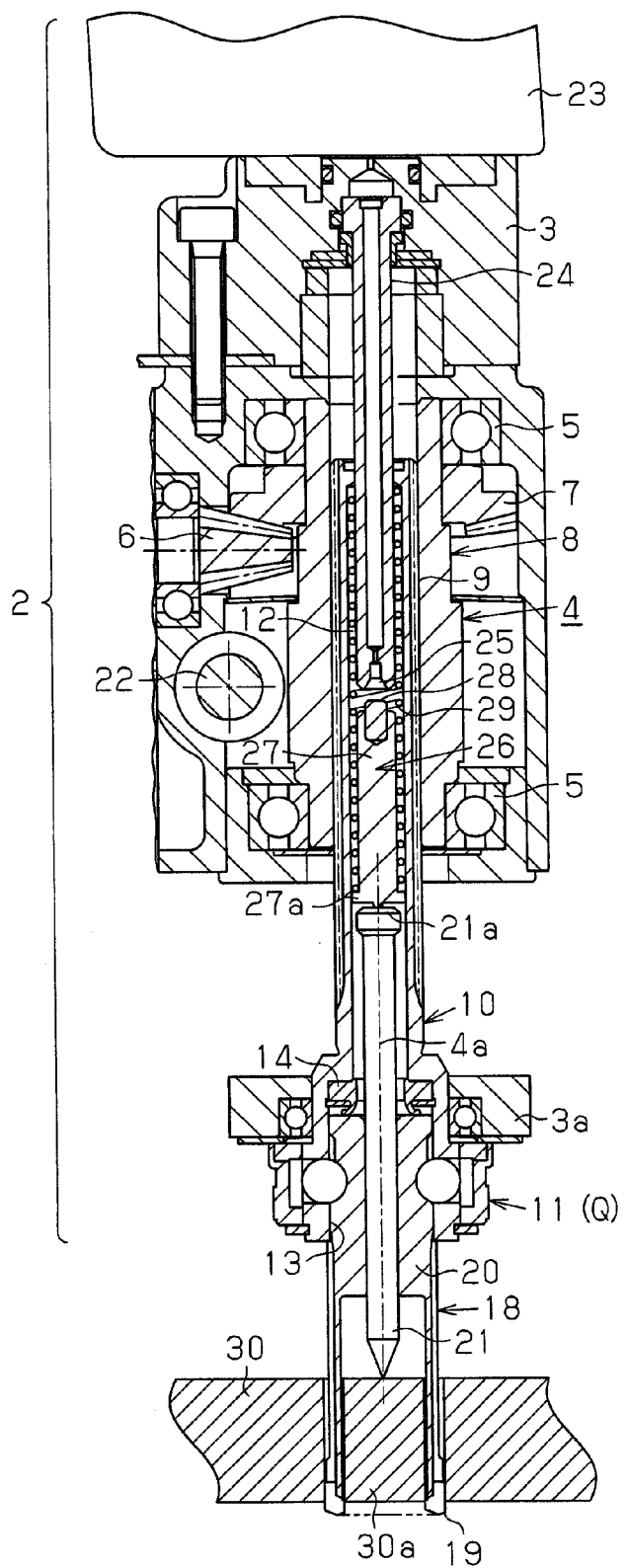
FIG. 4 is a partial cross-sectional view of the hole cutting apparatus immediately after it has finished a hole cutting operation, illustrating a state in which the oil supply pipe is open.

As shown in FIG. 4, when the blade cylinder 19 finishes cutting the workpiece 30 with the center pin 21 contacting the workpiece 30, the hole cutting apparatus is in a state immediately after finishing the hole cutting operation. Until the hole cutting apparatus reaches this state, the flange 27a of the valve body 26 remains pressed against the upper end 21a of the center pin 21 and separated from the mount portion 15a of the pressure receiving portion 14, and the opening-closing portion 28 of the valve body 26 keeps the valve port 25 of the oil supply pipe 24 open, so that oil is supplied to the blade cylinder 19 of the hole cutter 18.

Figure 5:
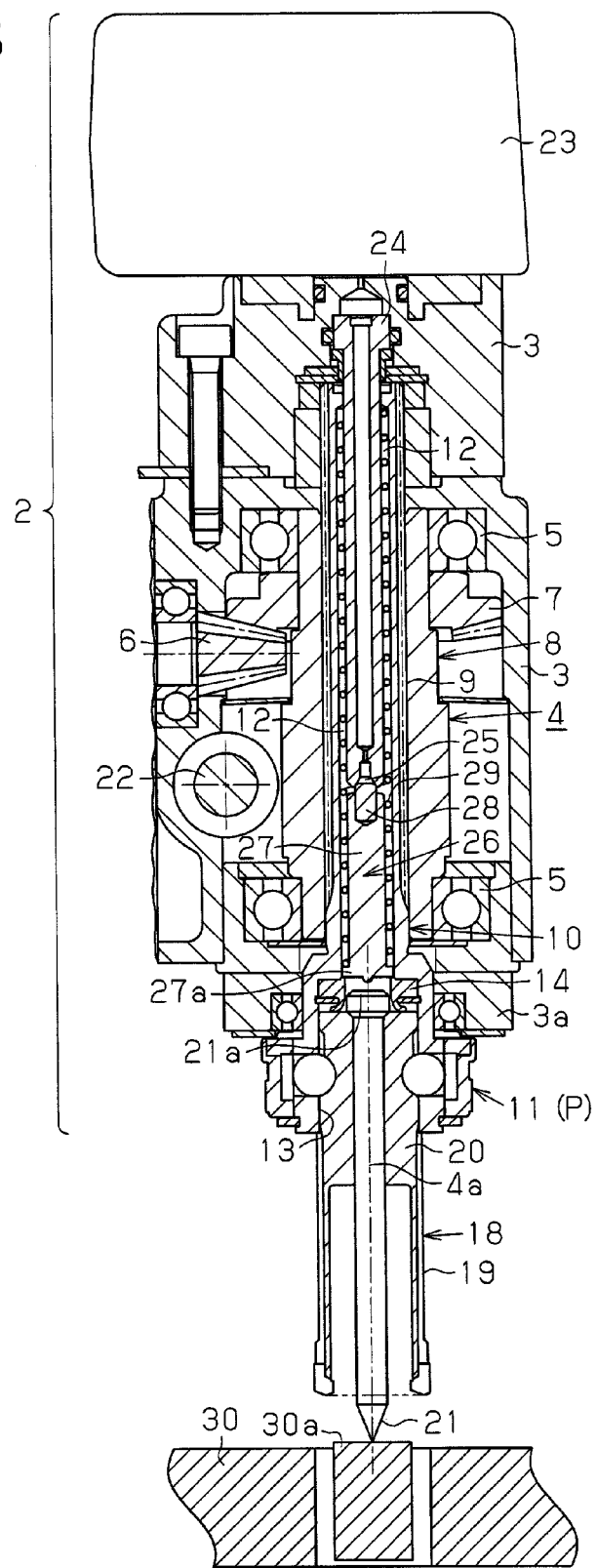
FIG. 5 is a partial cross-sectional view of the hole cutting apparatus after it has performed a hole cutting operation, illustrating a state in which the oil supply pipe is closed.

When the hole cutting apparatus is returned to a state before performing a hole cutting operation as shown in FIG. 5, the supply of oil is stopped. That is, when the inner cylinder 10 and the cutter attaching portion 11 are returned to the highest position in the direction along the rotational axis 4a together with the hole cutter 18, the supply of oil is stopped. A cut piece 30a separated from the workpiece 30 is pushed out of the blade cylinder 19 by the center pin 21.

The preferred embodiment has the following advantages.

(1) At the proximate position P, where the cutter attaching portion 11 is close to the oil supply pipe 24, the elastic force of the compression spring 29 supports the rod portion 27 of the valve body 26 against the pressure receiving portion 14 of the inner cylinder 10. Accordingly, the opening-closing portion 28 of the valve body 26 closes the valve port 25 of the oil supply pipe 24. When the cutter attaching portion 11 is at a separated position Q, where it is separated from the oil supply pipe 24, the rod portion 27 of the valve body 26 is supported at the upper end 21a of the center pin 21 by the elastic force of the compression spring 29, instead of being supported by the pressure receiving portion 14 of the inner cylinder 10. Accordingly, the opening-closing portion 28 of the valve body 26 opens the valve port 25 of the oil supply pipe 24. Therefore, the valve port 25 of the oil supply pipe 24 can be smoothly opened and closed by a simple opening-closing structure, and the supply of oil is automated. This saves the amount of oil.

(2) Since the opening-closing portion 28 of the valve body 26 is made of elastic material, the outflow of oil at the valve port 25 can be stopped by elastically pressing the opening-closing portion 28 of the valve body 26 against the valve port 25 of the oil supply pipe 24.

(3) Since the pressure receiving portion 14 of the inner cylinder 10 is made of elastic material, the rod portion 27 of the valve body 26, which is urged by the compression spring 29, can be elastically received by the cylindrical base 15 of the pressure receiving portion 14, so that the shock is dampened. In addition, the cylindrical sealing portion 16 of the pressure receiving portion 14 prevents oil that runs down from the outer circumference of the rod portion 27 onto the outer circumference of the center pin 21 in the oil hole 17 of the pressure receiving portion 14 from spreading, and such oil can be smoothly led to the outer circumference of the center pin 21 from the oil hole 17.

The preferred embodiment may be modified as follows, for example.

In the valve body, the opening-closing portion may be urged by a compression spring (not shown), so that the opening-closing portion has elasticity.

In the illustrated embodiment, the holder is formed by the outer cylinder and the inner cylinder. Instead, an integral holder may be used in which internal/external screw mechanism allows the holder to rotate and move in the direction along the rotational axis.

The compression spring 29 may be omitted. In that case, the rod portion 27 of the valve body 26 may be supported by being pressed by its own weight against the pressure receiving portion 14 of the inner cylinder 10 and the upper end 21a of the center pin 21.

Therefore, the present examples and embodiments are to be considered as illustrative and not restrictive and the invention is not to be limited to the details given herein, but may be modified within the scope and equivalence of the appended claims.

The invention claimed is:

1. An oil supply device for a hole cutting apparatus, comprising:
  a support member;
  a holder supported by the support member to be rotational relative to the support member and movable in a reciprocating manner in a direction along a rotational axis;
  a cutter attaching portion provided on a first side of the holder;
  an oil supply pipe having a valve port, the oil supply pipe being attached to the support member by being inserted into the holder along the rotational axis of the holder on a second side, which is a side opposite to the cutter attaching portion in the direction along the rotational axis of the holder;
  a pin for discharging a cut piece, wherein the pin is inserted into the cutter attaching portion from the first side of the holder along the rotational axis of the holder, and is movable in a reciprocating manner in the direction along the rotational axis of the holder; and
  a valve body, which is inserted into the holder between the oil supply pipe and the pin along the rotational axis of the holder, wherein the valve body is movable in a reciprocating manner in the direction along the rotational axis of the holder, wherein
  the oil supply pipe, the valve body, and the pin are arranged relative to the holder and along the rotational axis of the holder,
  the holder, the pin, and the valve body are movable in a reciprocating manner in the direction along the rotational axis of the holder in relation to the oil supply pipe,
  the valve body is movable in a reciprocating manner in a direction along the rotational axis of the holder in relation to the pin,
  at a proximate position, where the cutter attaching portion of the holder is close to the oil supply pipe, the valve body contacts the valve port of the oil supply pipe, while being supported by the holder, so that the valve body closes the valve port, and
  at a separated position, where the cutter attaching portion of the holder is separated away from the oil supply pipe, the valve body is separated from the valve port of the oil supply pipe, while being supported by the pin instead of the holder, so that the valve body opens the valve port,
  wherein the valve body includes:
  a rod portion, which is separated from the pin when at the proximate position and contacts the pin when at the separated position; and
  an opening-closing portion supported by the rod portion, wherein the opening-closing portion contacts the valve port of the oil supply pipe when at the proximate position and is separated from the valve port of the oil supply pipe when at the separated position.

2. The oil supply device for a hole cutting apparatus according to claim 1, wherein the opening-closing portion of the valve body has elasticity.

3. The oil supply device for a hole cutting apparatus according to claim 2, wherein the opening-closing portion of the valve body is made of an elastic material.

4. The oil supply device for a hole cutting apparatus according to claim 1, wherein the holder has a pressure receiving portion, which contacts the rod portion of the valve body when at the proximate position and is separated from the rod portion of the valve body when at the separated position, and wherein the pressure receiving portion is made of an elastic material.

5. The oil supply device for a hole cutting apparatus according to claim 4, wherein the pressure receiving portion includes:
  a cylindrical base, which contacts the rod portion of the valve body;
  a cylindrical sealing portion arranged outside of the pin, wherein the cylindrical sealing portion contacts a cutter attached to the cutter attaching portion; and
  an oil hole provided inside the cylindrical base and the cylindrical sealing portion to receive the pin such that the pin faces the rod portion of the valve body when at the proximate position and the separated position.

* * * * *